(12) United States Patent
Müller et al.

(10) Patent No.: US 6,843,740 B2
(45) Date of Patent: Jan. 18, 2005

(54) PRESSURE FEED TO A SHAFT

(75) Inventors: Klaus Müller, Meckenbeuren (DE); Manfred Sulzmann, Meckenbeuren (DE); Detlef Plath, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 133 days.

(21) Appl. No.: 10/286,556

(22) Filed: Oct. 31, 2002

(65) Prior Publication Data

US 2003/0092518 A1 May 15, 2003

(30) Foreign Application Priority Data

Nov. 13, 2001 (DE) .......................................... 101 55 721

(51) Int. Cl.[7] .............................................. F16H 61/06
(52) U.S. Cl. ........................................... 474/28; 474/18
(58) Field of Search ........................ 474/18, 28, 69–70, 474/46; 477/45–46, 48–49

(56) References Cited

U.S. PATENT DOCUMENTS

| | | | |
|---|---|---|---|
| 4,547,178 A | 10/1985 | Hayakawa et al. | ............ 477/45 |
| 4,881,925 A | 11/1989 | Hattori | ......................... 474/18 |
| 4,906,221 A * | 3/1990 | Taguchi | ....................... 474/93 |
| 5,269,726 A | 12/1993 | Swanson et al. | .............. 474/28 |
| 5,462,035 A | 10/1995 | Teraoka et al. | ............... 474/28 |
| 6,015,359 A | 1/2000 | Kunii | .......................... 474/18 |
| 6,394,920 B1 * | 5/2002 | Morlok | ......................... 474/28 |
| 2001/0016527 A1 * | 8/2001 | Hiroshima et al. | ............. 474/8 |

FOREIGN PATENT DOCUMENTS

| | | | | |
|---|---|---|---|---|
| DE | 21 48 819 B2 * | 7/1981 | ........... F16H/57/04 |
| DE | 195 33 993 A1 * | 3/1997 | .......... F16H/57/02 |
| DE | 199 21 749 A1 * | 11/1999 | .......... F16H/55/56 |
| DE | 199 32 339 A1 * | 1/2001 | .......... F16H/63/06 |
| DE | 100 60 149 A1 * | 7/2001 | .......... F16H/57/00 |
| FR | 2618513 A1 | 1/1989 | ................. 474/18 |
| GB | 1 406 298 * | 9/1975 | .......... F16H/57/04 |
| JP | 58137654 A * | 8/1983 | ............. F16H/9/18 |
| JP | 61-105345 | 5/1986 | ............. F16H/9/18 |
| JP | 61-109951 A | 5/1986 | ............. F16H/9/18 |
| JP | 05-288261 A | 11/1993 | ................. 474/18 |
| JP | 11-153213 A | 6/1999 | .......... F16H/57/02 |
| JP | 11-159589 A | 6/1999 | ............. F16H/9/18 |
| JP | 2001-82562 A | 3/2001 | ............. F16H/9/16 |

* cited by examiner

Primary Examiner—Marcus Charles
(74) Attorney, Agent, or Firm—Davis & Bujold, P.L.L.C.

(57) ABSTRACT

A hydraulic fluid feed mechanism that feeds into a shaft (1) of a transmission having a hydraulic control device, by which the hydraulic feed mechanism can be supplied with hydraulic fluid, comprising a transmission housing (3) in which the shaft is held, and a housing cover (7) that is equipped with feed bores (8, 9), by which the hydraulic fluid is fed from the hydraulic control device into the shaft (1). A hydraulic fluid line (12) is positioned between the hydraulic or pneumatic control device and a feed bore (9) in the housing cover (7) that extends parallel to the shaft (1), with this hydraulic fluid line being comprised of a fitting (13) and a tube (14) which is permanently inserted into the fitting at nearly right angles, forming a pressure-tight seal. The fitting (13) is pushed through a transmission housing bore (15) that extends parallel to the shaft (1), is separably inserted into the feed bore (9) forming a pressure-tight seal, and is axially mounted to the transmission housing (3) by a sealing ring (20).

10 Claims, 1 Drawing Sheet

PRESSURE FEED TO A SHAFT

This application claims priority from German Application Ser. No. 101 55720.5 filed Nov. 13. 2001.

FIELD OF THE INVENTION

The Invention relates to a hydraulic fluid feed mechanism feeding into a shaft of a transmission, especially into a variable speed gear shaft of a continuously variable transmission.

BACKGROUND OF THE INVENTION

Hydraulic fluid feed mechanisms that lead into a rotating shaft mounted in a transmission housing are known in a multitude of designs. For example, DE 199 21 749 A1 describes a hydraulic fluid feed mechanism that feeds into a primary shaft of a variable speed belt gear of a continuously variable, automatic transmission. The primary shaft is mounted on a bearing in a transmission housing. A bearing bore extending through the wall of the transmission housing in the area around the bearing is planned. The bearing is mounted axially in the transmission housing with a sealing ring. An electric-hydraulic control device is provided to supply hydraulic fluid to the variable speed gear; this device is oriented perpendicularly to the bearing bore on the end surface of the transmission housing and simultaneously serves to cover the bearing bore in the transmission housing. The supply of hydraulic fluid from the electric-hydraulic control device into an axial bore in the primary shaft is accomplished by a plain conduit system, in which two tubes, one inside the other, are inserted into a variable stage bore of the electric-hydraulic control device creating an oil-tight connection; both tubes extend into the axial bore in the primary shaft, and each of the two tubes is sealed against the rotation of the primary shaft by a sleeve bearing. The outer tube is axially fastened to the electric-hydraulic control device by a retaining panel. The inner tube is not secured in any way.

In DE 199 32 339 A1, of the applicant is a hydraulic fluid feed mechanism for a variable speed gear shaft of a continuously variable transmission became known, in which the supply of hydraulic fluid by a hydraulic transmission control device is accomplished by hydraulic feed lines located within a transmission housing, and by hydraulic feed lines located in a housing cover, into an axial variable bore in the variable speed gear shaft. The variable speed gear shaft is mounted in the transmission housing on at least one bearing, wherein the bearing is positioned within a corresponding bearing bore in the transmission housing and is fastened axially in this bearing bore by a retaining panel. The bearing bore is designed as a through bore into which the variable speed gear shaft extends. The bearing bore[hole] is covered by the housing cover. A tubular projection from the housing cover extends into the axial variable bore of the variable speed gear shaft, and is sealed against the rotating variable speed gear shaft by a rectangular-section ring. The hydraulic fluid is fed from a channel in the transmission housing into a channel in the housing cover that runs parallel to the shaft; from there it is fed into a boring in the housing cover that is oriented perpendicularly to the shaft and from there into a boring in the housing cover that is oriented perpendicularly to the shaft and, finally, by an inner axial boring in the tubular projection of the housing cover into the variable speed gear shaft. A flat packing seals the hydraulic fluid channels in the partition between the transmission housing and the housing cover from the outside.

The object of the present invention is to further develop a hydraulic fluid feed mechanism leading from a hydraulic or pneumatic transmission control device into a shaft of a transmission, especially for applications in which the pressure discharge from the hydraulic or pneumatic transmission control device to the shaft does not take place in the immediate vicinity of the shaft, while taking into consideration seal tightness problems, especially at high pressures.

Base on the known state of the art, the hydraulic fluid mechanism feeding into the shaft of a transmission comprises a hydraulic or pneumatic control device by which the hydraulic feed mechanism can be filled with hydraulic fluid; a transmission housing in which the shaft is positioned, and a housing cover, which is equipped with feed bores by which the hydraulic fluid is introduced into the shaft by the hydraulic or pneumatic control device.

SUMMARY OF THE INVENTION

According to the invention, it is recommended that the hydraulic line be positioned between the hydraulic or pneumatic control device and a feed bore in the housing cover be oriented parallel to the shaft; the hydraulic line is comprised of a fitting and a tube that is permanently fastened to the fitting, producing a pressure-proof seal. Further, the tube is inserted into the fitting at nearly right angles. The fitting is inserted all the way through a accordingly designed bore in the transmission housing that is oriented parallel to the shaft and is inserted into the feed bore fore part surface of the housing cover. The side of the tube that faces away from the fitting is connected to the hydraulic fluid outlet channel of the hydraulic or pneumatic control device, producing a detachable pressure-proof seal. The hydraulic line is fastened axially to the transmission housing.

The hydraulic line can be axially mounted by a sealing ring, which becomes engaged in a correspondingly designed groove in the fitting. In this case the fitting is advantageously equipped with a heel designed as a buffer, which is supported by the wall of the transmission housing when it is pushed through the bore in the transmission housing, wherein the groove is positioned in the area of the transmission housing wall that is opposite the relief. Once the fitting has been pushed through the bore in the transmission housing, the sealing ring becomes engaged in the groove of the fitting, thus fastening the hydraulic line axially in the transmission housing.

In another design of the axial mounting of the hydraulic line in the transmission housing, a snap ring can be provided. Once the fitting has been pushed through the bore in the transmission housing, the snap ring becomes engaged in corresponding grooves in the transmission-housing bore and in the fitting.

With the design of the hydraulic fluid feed mechanism specified in the invention, a secure, pressure-proof connection between the hydraulic or pneumatic control devices and the shaft is advantageously ensured, even under very high pressure, since the pressure-dependent supporting forces will not permit an inadmissible axial shift in the hydraulic line. It is not necessary for the hydraulic or pneumatic control device to be located immediately adjacent to the shaft. The parallel orientation of the shaft and the housing cover and the separable coupling of the hydraulic line to the housing cover facilitate the assembly and disassembly of the housing cover. Further, the assembly sequence for the hydraulic or pneumatic control device within the transmission housing can be implemented independent of the assembly of the hydraulic fluid feed mechanism from the control device to the shaft.

In one design of the invention, it is proposed that the tube and the fitting for the hydraulic fluid line be soldered, welded, or glued together. This will reduce the risk of leakage from this joint, both directly during assembly and during operation as a result of pressure changes and vibration, as compared with a pressure connection between the tube and the fitting.

The above-described hydraulic fluid feed mechanism is particularly well suited for use as a hydraulic fluid feed mechanism for a variable speed gear shaft in a continuously variable automatic transmission. Because in such a system relatively large flow volumes, at times under high pressure, must be introduced into the rotating shaft, an axial introduction of hydraulic fluid into the rotating variable speed shaft is favorable. The axial space that is required in the hydraulic fluid feed mechanism, specified in the invention, at the end surface of the variable speed shaft where the hydraulic fluid is introduced is relatively small and is limited to the geometric dimensions of the bearing cover, with allowances for the necessary cross-sections and wall thicknesses of the hydraulic fluid channels located within the bearing cover. The hydraulic control device, by which the variable speed shaft is supplied with hydraulic fluid, can be oriented parallel to the variable speed shaft, thus decreasing the necessary length of the transmission.

Of course, the hydraulic fluid feed mechanism is universally applicable in a transmission shaft, and is not restricted to use as a hydraulic fluid feed mechanism in a variable speed gear shaft as described by way of example above.

BRIEF DESCRIPTION OF THE DRAWING

The invention will now be described by way of example, with reference to the accompanying drawings in which.

DETAILED DESCRIPTION OF THE INVENTION

Figure 1:
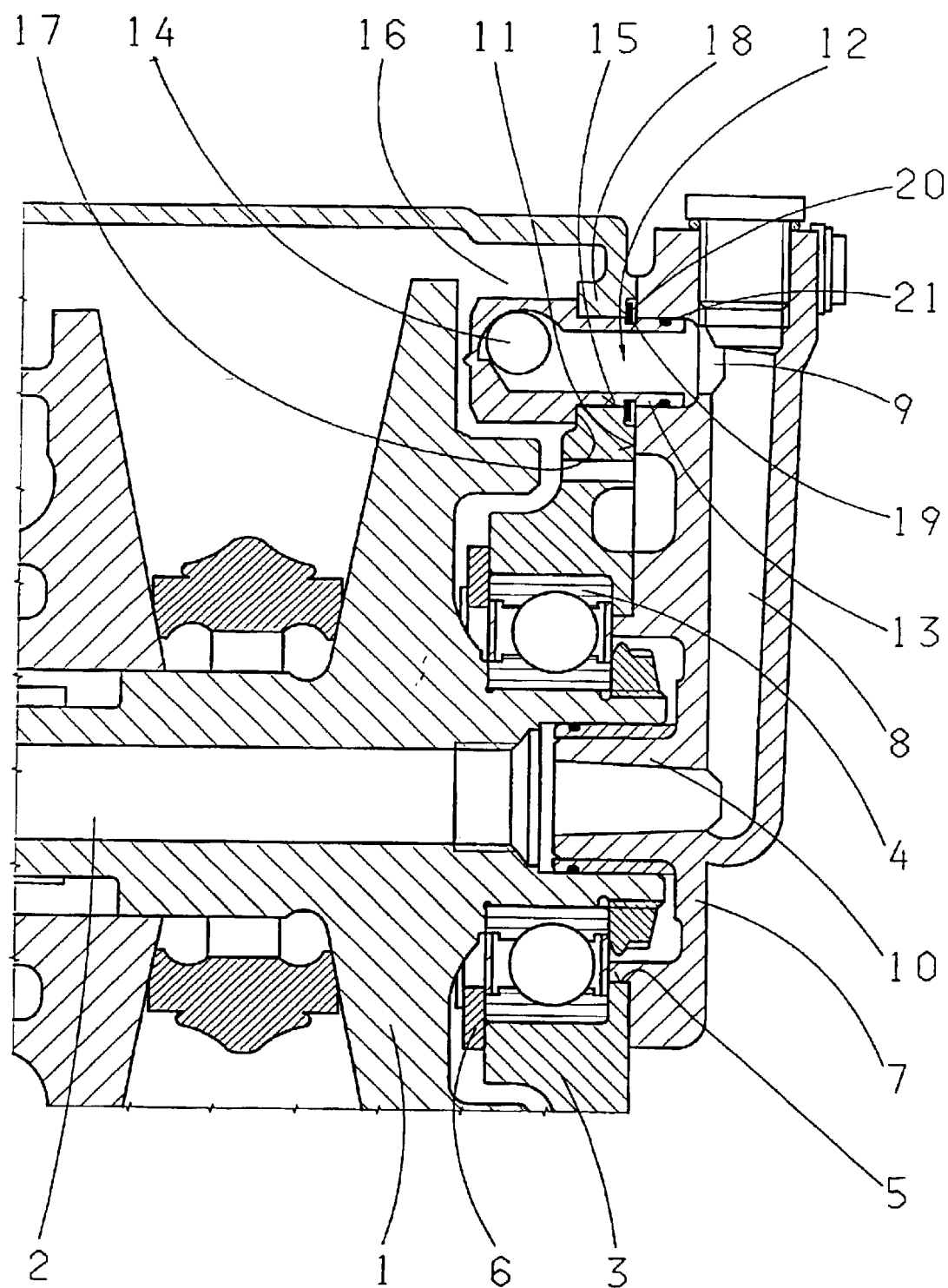
FIG. 1 shows a hydraulic fluid feed mechanism in a rotating, variable speed gear shaft of a continuously variable transmission.

As a design example of a hydraulic fluid feed mechanism in a transmission shaft, as specified in the invention, the single diagram shows a hydraulic fluid feed mechanism in a rotating, variable speed gear shaft of a continuously variable transmission.

The FIG. 1 denoting the shaft of a transmission in the design example shows a variable speed shaft of the continuously variable automatic transmission. The shaft 1 is held by a bearing 5—in the design example of an antifriction bearing—in a transmission housing 3. The shaft 1 extends through the transmission housing 3 in the area of a bearing bore 4 intended for the bearing 5. The bearing bore 4 is covered by a housing cover 7. The bearing 5 is axially fastened to the shaft 1 by a shaft nut and in the transmission housing 3 by a retaining panel 6. Of course, other designs for mounting the shaft 1 within the transmission housing 3 are known to the-state-of-the-art experts in the field. The shaft 1 is equipped with an axial shaft bore 2 at the end of the shaft that faces the bearing cover 7 which, in the example, is designed as a variable bore and by which hydraulic fluid is introduced from a hydraulic or pneumatic control device in the transmission, not illustrated here, into the shaft 1. The feed of hydraulic fluid in this axial shaft bore 2 is implemented by several feed bores 8 and 9, which are located in the bearing cover 7. In the design example shown, the feed bore 8 extends within the housing cover 7 perpendicular to the shaft 1, and opens up at one end by a tubular section 10 of the housing cover 7 into the axial shaft bore 2, and at the other end within the housing cover in the feed bore 9, which extends parallel to the shaft 1. This feed bore 9 is sealed against the outside area of the transmission, and opens up in the area of the face surface 11 of the housing cover 7 that faces toward the bearing bore 4, within the transmission housing 3.

According to the invention, a hydraulic line 12 is located between the feed bore 9 in the housing cover 7 that extends parallel to the shaft 1 and a hydraulic fluid outlet channel from the hydraulic or pneumatic control device of the transmission, which is not illustrated here; this hydraulic line comprises a fitting 13 and a tube 14 and is mounted from an inner area 16 of the transmission housing 3 outward. Here, the fitting 13 and tube 14 are permanently attached to one another, in a pressure-tight seal, for example by a pressure seal, soldering, welding, or an adhesive connection. The side of the tube 14 that faces away from the fitting 13 is connected by a detachable pressure-tight connection to the hydraulic fluid outlet channel of the hydraulic or pneumatic control device of the transmission, for example by a socket connection sealed with a gasket. The side of the fitting 13 opposite the tube 14 is separably connected in a pressure-tight seal to the feed bore 9 in the housing cover 7, which extends parallel to the shaft.

In addition, in the wall 18 of the transmission housing 3 that borders the face surface 11 of the housing cover 7 facing the bearing bore 4, a separate transmission housing bore 15 that extends parallel to the shaft 1 is provided, through which the fitting 13 is pushed from the inside space 16 of the transmission housing 3 and, during assembly, is inserted into the feed bore 9 of the housing cover 7, forming a removable, pressure-tight seal; the feed bore in the housing cover also extends parallel to the shaft 1. In the design example, in an assembled state, the fitting 13 extends into the feed bore 9 and is sealed by a gasket 21 against the diameter of the feed bore 9. Of course, the connection between the fitting 13 and the feed bore 9 may also be designed differently, for example as a flat seat with a flat seal.

To prevent any unintentional axial shifting of the hydraulic line 12 during operation, especially when it is filled with hydraulic fluid, the hydraulic fluid line 12 is axially fastened to the transmission housing 3.

In one of the first designs of the axial mounting of the hydraulic fluid line 12 it was proposed that the fittings 13 for the hydraulic fluid line 12 be fastened by a sealing ring 20 to the wall 18 of the transmission housing 2 [sic]. To this end, the fitting 13 is equipped with a heel 17, which rests in the area of the transmission housing bore 15 against the wall 18 of the transmission housing 3. The fitting 13 is further equipped with a groove 19, which is positioned on the side of the housing wall 18 opposite the heel 17 of the fitting 13. Once the fitting 13 of the hydraulic fluid line 12 has been pushed through from the inside space 16 of the transmission housing 3, through the transmission housing bore 15, the sealing ring 20 moves from the side of the housing wall 18 that faces the housing cover 7, and becomes engaged in the groove 19 of the fitting 13, thus fastening the hydraulic fluid line 12 axially on the wall of the housing 18.

In a second design of the axial mounting of the hydraulic fluid line 12 it is proposed that the hydraulic fluid line 12 be fastened by a snap ring in the wall 18 of the transmission housing 2. To this end, the fitting 13 of the hydraulic fluid line 12 is equipped with a radial groove on its outer surface, in a section that lies in the area of the transmission housing bore 15 that extends parallel to the shaft 1. Furthermore, a radial groove is located in the transmission housing bore 15 in the housing wall 18, which extends parallel to the shaft 1.

Prior to assembly of the hydraulic fluid line 12, the snap ring is emplaced either within the radial groove in the transmission housing bore 15, or in the radial groove in the fitting 13. If the snap ring is emplaced in the radial groove in the transmission housing bore 15 prior to assembly of the hydraulic fluid line then, when the fitting 13 in the hydraulic fluid line 12 is pushed through the transmission housing bore 15, the snap ring is first spread apart and then snapped into the radial groove in the fitting 13. If the snap ring is emplaced in the radial groove in the fitting 13 of the hydraulic fluid line 12 prior to assembly of the hydraulic fluid line 12, then when the fitting 13 is pushed through the transmission housing bore 15, the snap ring is first compressed and then snaps into the radial groove in the transmission housing bore 15. In both cases, after assembly of the hydraulic fluid line 12 the snap ring remains engaged in both grooves, thus ensuring an axial mounting of the hydraulic fluid line 12 relative to the transmission housing 3.

Reference Numerals

1 Shaft
2 Axial Shaft Bore
3 Transmission Housing
4 Bearing Bore of the Transmission Housing
5 Bearing
6 Retaining Panel for the Bearing
7 Housing Cover
8,9 Feed Bores in Housing Cover
10 Section of Housing Cover
11 End Surface of Housing Cover
12 Hydraulic Fluid Line
13 Fittings for Hydraulic Fluid Line
14 Tube for Hydraulic Fluid Line
15 Transmission Housing Bore
16 Inside Space of Transmission Housing
17 Shoulder of the Fitting
18 Transmission Housing Wall
19 Groove for Fitting
20 Sealing Ring
21 Gasket for Fitting

What is claimed is:

1. A fluid feed mechanism system feeding into a shaft (1) of a transmission with one of a hydraulic and pneumatic control device, by which the fluid feed system can be supplied with a fluid medium, comprising a transmission housing (3) in which tie shaft (1) is mounted, end a housing cover (7) that is equipped with feed bores (8, 9), by which the fluid medium is fed from the control device into the shaft (1), wherein a fluid line (12) is positioned between the control device and a feed bore (9) in the housing cover (7) that is oriented parallel to the shaft (1), with this feed line comprising a fitting (13) and a tube (14), which is permanently inserted substantially at right angles into the fitting (13) forming a pressure-tight seal, wherein the fitting (13) is inserted through a transmission housing bore (15), which extends parallel to the shaft (1), from an area (16) inside the transmission housing (3), and is separably inserted into the feed bore (9) in an end surface (11) of the housing cover (7) that extends parallel to the shaft (1), forming a pressure-tight seal, and wherein the side of the tube (14) opposite the fitting (13) is separably connected to a fluid outlet channel for the control device, forming a pressure-tight seal; and in that the fluid line (12) is fastened axially to the transmission housing (3).

2. The fluid feed mechanism according to claim 1, wherein the fitting (13) is equipped with a heel (17), which rests against a wall (18) of the transmission housing (3) in the area of the transmission housing bore (15); in that the fitting (13) is equipped with a groove (19), which is located in the area of the aide of the housing wall (18) opposite the heel (17) of the fitting (13); and in that the fluid line (12) is mounted axially to the housing wall (18) by a sealing sing (20) that becomes engaged in the groove (19) of the fitting (13).

3. The fluid feed mechanism according to claim 1, wherein the fitting (13) is equipped with a first radial groove along its outer surface, in a section that lies in the area of the transmission housing bore (15) that extends parallel to the shaft (1); in that a second radial groove is positioned in the transmission housing bore (16) that extends parallel to the shaft (1); and in that a snap ring is provided to allow the axial mounting of the fluid line (12) on the transmission housing (3), with this snap ring becoming engaged in the first and second grooves when the fitting (13) is pushed through the transmission housing bore (15) that extends parallel to the shaft (1).

4. The fluid feed mechanism according to claim 1, wherein the fitting (13) and the tube (14) of the fluid line (12) are one of pressed, soldered, welded and glued to one another.

5. The fluid feed mechanism according to claim 1, wherein the shaft (1) is a variable speed gear shaft in a continuously variable automatic transmission.

6. A fluid feed apparatus for controlling a transmission having a transmission housing (3) in which a shaft (1) is mounted, the fluid feed apparatus comprising:

one of a hydraulic and pneumatic control device controlling a fluid medium;

a transmission housing cover (7) that is equipped with a first and second feed bores (8, 9), by which the fluid medium is fed from the control device into the shaft (1), a fluid feed line (12) is positioned between the control device and the first feed bore (9) which is formed in the housing cover (7) parallel to the shaft (1);

the fluid feed line comprises a fitting (13) and a tube (14) which is permanently inserted substantially at right angles into the fitting (13) forming a pressure-tight seal, and the fitting (13) is inserted from an area (16) inside the transmission housing (3) through a transmission housing bore (15) formed parallel to the shaft (1), into the feed bore (9) which is also formed parallel to the shaft (1) in an end surface (11) of the housing cover (7) to form a pressure-tight seal, and wherein an end of the tube (14) opposite the fitting (13) is separably connected to a fluid outlet channel of the control device, and the fluid feed line (12) is positioned axially relative to the shaft (1) in the transmission housing (3).

7. The fluid feed mechanism according to claim 6, wherein the fitting (13) further comprises a heel (17), which rests against a wall (18) of the transmission housing (3) in the area of the transmission housing bore (15); and a groove (19) spaced from the heel (17) of the fitting (13) and positioned adjacent a portion of the housing wall (18) for mounting the fluid feed line (12) axially to the housing wall (18) by a sealing ring (20) that becomes engaged in the groove (19) of the fitting (13).

8. The fluid feed mechanism according to claim 6, wherein the fitting (13) comprises a first radial groove along an outer surface of the fitting lying adjacent an area of the transmission housing bore (15) that extends parallel to the shaft (1) and a second radial groove is formed in the transmission housing bore (15) and a snap ring is provided to facilitate the axial mounting of the fluid feed line (12) to the transmission housing (3), with this snap ring becoming engaged in the first and second radial grooves when the fitting (13) is pushed through the transmission housing bore (15) that extends parallel to the shaft (1).

9. The fluid feed mechanism according to claim 6, wherein the fitting (13) and the tube (14) of the fluid line (12) are one of pressed, soldered, welded and glued to one another.

10. The fluid feed mechanism according to claim 6, wherein the shaft (1) is a variable speed gear shaft in a continuously variable automatic transmission.

* * * * *